United States Patent [19]

Fjällström et al.

[11] Patent Number: 4,676,809
[45] Date of Patent: Jun. 30, 1987

[54] HYDROCYCLONE PLANT

[75] Inventors: Roland Fjällström, Lawrenceville, Ga.; Rune Frykhult, Stockholm, Sweden

[73] Assignee: Celleco AB, Stockholm, Sweden

[21] Appl. No.: 774,949

[22] Filed: Sep. 11, 1985

[30] Foreign Application Priority Data

Sep. 12, 1984 [SE] Sweden ............................. 8404573

[51] Int. Cl.⁴ ............................................ B01D 19/00
[52] U.S. Cl. .................................. 55/204; 162/380; 209/211; 210/512.2
[58] Field of Search .................. 55/190, 204, 206; 210/512.2, 512.3; 209/211; 162/55, 380

[56] References Cited

U.S. PATENT DOCUMENTS

| 2,927,693 | 3/1960 | Freeman et al. | 209/211 |
| 3,163,508 | 12/1964 | Tuck et al. | 55/204 |
| 3,432,036 | 3/1969 | Kaiser | 209/211 |
| 3,543,932 | 12/1970 | Rastatter | 209/211 |
| 4,134,827 | 1/1979 | Frykhult | 209/211 |

Primary Examiner—Charles Hart
Attorney, Agent, or Firm—Cyrus S. Hapgood

[57] ABSTRACT

In a hydrocyclone plant for separating a fiber pulp suspension into a light phase and a heavy phase, comprising at least two hydrocyclones (1, 2) connected in series, there is provided a device (20) arranged both for degassing a first stream of separated heavy phase coming from one of said hydrocyclones (1) and a second stream of liquid supplied to dilute the first stream, and for mixing said two streams before they are supplied to the other one of said hydrocyclones (2).

12 Claims, 5 Drawing Figures

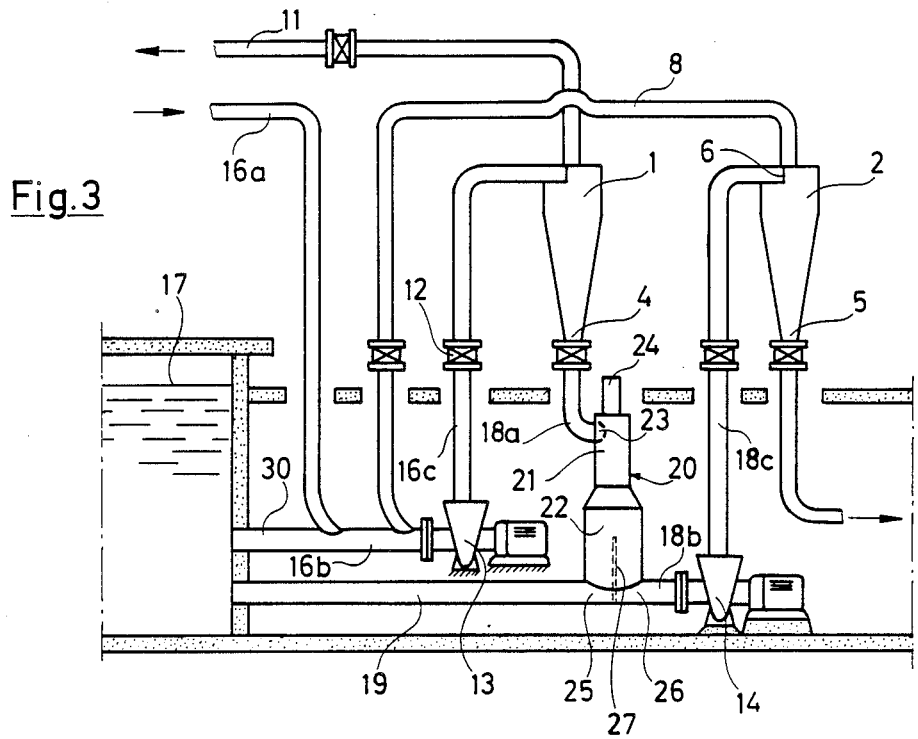
Fig. 3
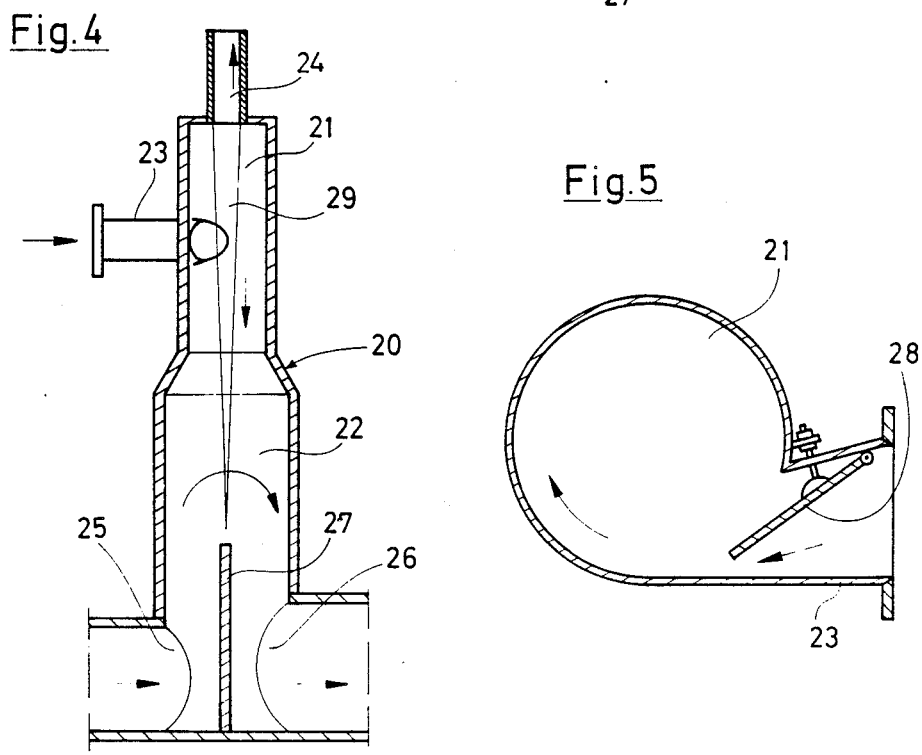
Fig. 4
Fig. 5

HYDROCYCLONE PLANT

The present invention relates to a hydrocyclone plant for separating a pulp suspension into a light phase and a heavy phase, comprising at least two hydrocyclones, each of which has an inlet for a stream to be separated, an outlet for a stream of light phase, and an outlet for a stream of heavy phase; a heavy phase conduit, which connects the heavy phase outlet of one of the hydrocyclones with the inlet of the other hydrocyclone; a container with a diluting liquid, for instance so called white water; a conduit for a stream of diluting liquid, extending between said container and said heavy phase conduit; and a pump arranged in the heavy phase conduit between the connection point of the diluting liquid conduit and the inlet of said other hydrocyclone.

In the cellulose and paper industry hydrocyclone plants are used to a great extent for the purification of fiber suspensions from impurities. In order to reduce the losses of valuable fibers at the purification such a plant is arranged in several stages, often four stages. Each stage comprises a plurality of hydrocyclones connected in parallel, for instance from about 500 in the first stage down to only a few in the last stage. In the following, there will be referred only to a special case with one hydrocyclone in each stage. Each such hydrocyclone can of course be substituted by any number of hydrocyclones connected in parallel.

The hydrocyclone stages are connected in cascade, so that the heavy phase, that is the reject flow, from a first hydrocyclone is supplied to a second hydrocyclone, the light phase of which, that is the accept flow, is returned to the first hydrocyclone, while the heavy phase from the second hydrocyclone may be purified in a third hydrocyclone etc.

The suspension supplied to the hydrocyclones should not have a higher degree of fiber concentration than about 0.6%. Since a separated heavy phase has a fiber concentration of about 2%, the heavy phase must be diluted before it is supplied to the next hydrocyclone. The diluting of the heavy phase is accomplished by means of a diluting liquid, for instance so called white water from a paper making machine, supplied to the hydrocyclones through conduits from a container. The white water may contain a small amount of fibers, too, for instance 0.1%, and therefore the stream of heavy phase may need to be diluted by a stream of white water being, for example, three times larger.

A conventional plant of the kind described above has certain drawbacks. Since air should be avoided as far as possible in the final light phase, that is the fiber suspension going to for instance a paper making machine, the hydrocyclones are adjusted such that a large part of the air in the incoming suspension is entrained with the heavy phase. Hereby, there will be a gradually increasing air content in the liquid as it passes through the hydrocyclone plant stage by stage and finally is discharged as a reject stream from the last hydrocyclone stage. If the air content becomes too large, problems will arise with the function of the pumps and hydrocyclones in the last stages.

However, in spite of the degassing of the incoming suspension thus taking place in the plant, there is often too much air in the final light phase. Therefore, this often must be degassed in a special device before it can be supplied to, for instance, a paper making machine. A conventional such degassing device is very expensive, because it comprises a large container, in which there must be maintained a sub-pressure near vacuum in order to obtain a satisfactory degassing. Degassing by centrifugal separation in this connection is not suitable because of the large flow of the final light phase, for instance about 100,000 litres/minute.

Even the white water contains a certain amount of air, which enters the plant and contributes in creating the above described problems.

The object principal of the present invention is to provide a hydrocyclone plant in which the above described drawbacks in connection with previously known hydrocyclone plants are eliminated. This object is achieved according to the invention by a hydrocyclone plant of the initially described kind, which essentially is characterized by a device for degassing said streams of heavy phase and diluting liquid and for mixing said streams, comprising (1) a rotationally symmetrical chamber, (2) a tangential inlet to the chamber, which inlet is connected to the heavy phase conduit coming from said heavy phase outlet of said one hydrocyclone, for the supply of a stream of heavy phase in such a way that this stream is brought into rotation in the chamber, forming a core of separated gas in the centre of said chamber, (3) a central outlet from the chamber for separated gas, (4) a diluting liquid inlet to the chamber arranged at an axial distance from the heavy phase inlet and connected to the diluting liquid conduit for the supply of a stream of diluting liquid, the diluting liquid inlet being adapted to introduce the diluting liquid into the chamber such that said liquid comes into contact with the central gas core formed in the chamber for degassing of the diluting liquid stream, and (5) an outlet from the chamber for a degassed mixture of heavy phase and diluting liquid, connected to said heavy phase conduit before said pump.

By means of a device of this kind, centrifugal separation technique may be utilized for efficient degassing of the fiber suspension. Instead of having an extra degassing device for degassing the entire stream of the final light phase, degassing is thus performed according to the invention by centrifugal separation of only a relatively small stream. In addition, extra energy need not be supplied for the degassing operation.

Since the streams of heavy phase and diluting liquid are degassed and mixed in one and the same device, this can be given a simple design and will be cheap to produce. The central gas core formed in the chamber is utilized for the degassing of the diluting liquid in a way such that gas in the latter, which is getting into contact with the gas core, is separated from the diluting liquid. Hereby, no extra pump is needed for increasing the pressure of the diluting liquid to a degree such that the relatively large stream of diluting liquid could be degassed by centrifugation. The low rate of flow of the diluting liquid, about 0.5 metre/second, required for accomplishing the degassing of the diluting liquid when it passes the gas core formed in the chamber, is preferably obtained by the pressure exerted by diluting liquid present in the diluting liquid container.

During the degassing of the diluting liquid there is also a good mixing of the same with the heavy phase, whereby a constant content of fibers is obtained in the fiber suspension stream leaving the device.

Preferably, there is provided in the heavy phase inlet of the above-mentioned chamber a means for adjusting the working pressure of the first hydrocyclone, which leads to a maximum rate of flow into the chamber. Normally, a valve is arranged in the heavy phase outlet of said hydrocyclone for the adjustment of the working pressure in the hydrocyclone. The aforesaid means can thus take over the function of this valve and, accordingly, the latter may be left out. Hereby, the whole available amount of pressure energy may be utilized for optimizing the rate of flow tangentially into the chamber, which increases the separation efficiency.

In a preferred embodiment of the plant according to the invention, the chamber comprises a first portion provided with the heavy phase inlet and the central outlet for separated gas, and a second portion provided with the diluting liquid inlet and the outlet for a degassed mixture. The first chamber portion is adapted to communicate with the second chamber portion such that a rotating degassed stream, flowing from the first chamber portion into the second chamber portion, continues to rotate in the second chamber portion. The first and second chamber portions are preferably coaxially arranged, the second chamber portion having a larger volume than the first chamber portion, such that the rate of flow of the diluting liquid through the second chamber will be low.

The first and second chamber portions preferably are cylindrical, the first chamber portion having a smaller radius than the second chamber portion, because the separation efficiency increases with a decreasing radius. Hereby, a particularly simple and appropriate design of the chamber is obtained.

The invention will be described more closely below with reference to the accompanying drawing, in which FIG. 1 shows a flow diagram of a conventional plant comprising three hydrocyclones;

FIG. 3 shows a hydrocyclone plant according to the invention comprising two hydrocyclones;

FIG. 4 shows a sectional view of a device for degassing and mixing of streams, being part of a hydrocyclone plant according to the invention; and FIG. 5 shows a cross-sectional view of a chamber in the degassing device, and the heavy phase inlet of the chamber provided with a means for adjusting the rate of flow into the chamber.

Figure 1:
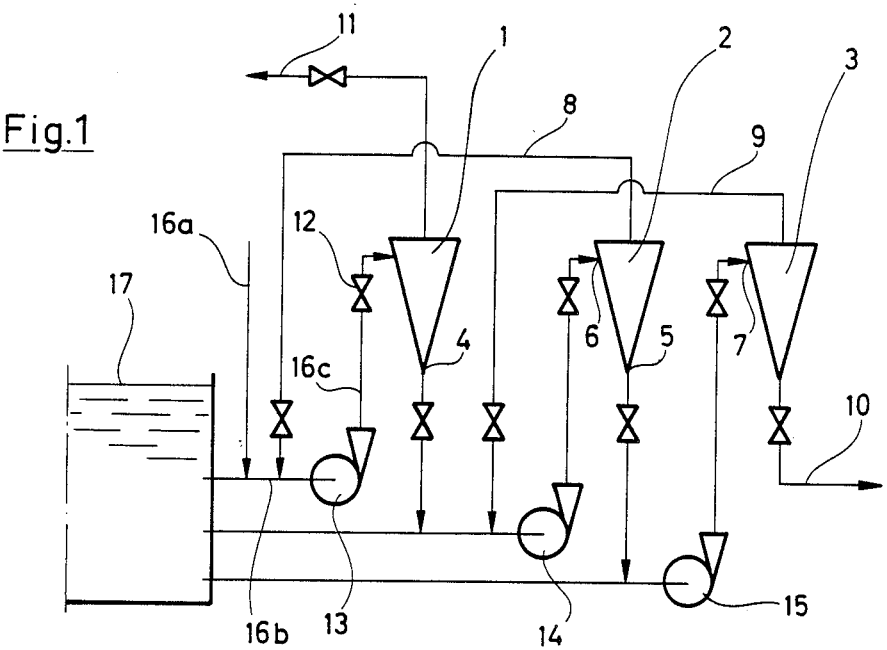

In FIG. 1, there is shown diagrammatically a conventional plant with three hydrocyclones 1, 2 and 3 connected in cascade. The hydrocyclones are, thus, connected in series such that separated heavy phase is conducted through conduits between the heavy phase outlets 4 and 5 of the hydrocyclones 1 and 2, and the respective inlets 6 and 7 of the hydrocyclones 2 and 3, while separated light phase is returned from the hydrocyclones 2 and 3 to the respective preceding hydrocyclones 1 and 2 through conduits 8 and 9. The final heavy phase leaves through a conduit 10 from the third hydrocyclone 3, and the final light phase leaves through a conduit 11 from the first hydrocyclone 1. The plant is provided with a number of valves, for instance the valve 12, for adjusting the working pressures in the hydrocyclones. Three pumps 13, 14 and 15 are arranged for operating the plant, which is charged with fiber suspension through conduits 16a-c and diluting liquid, for instance white water, from a container 17.

Figure 2:
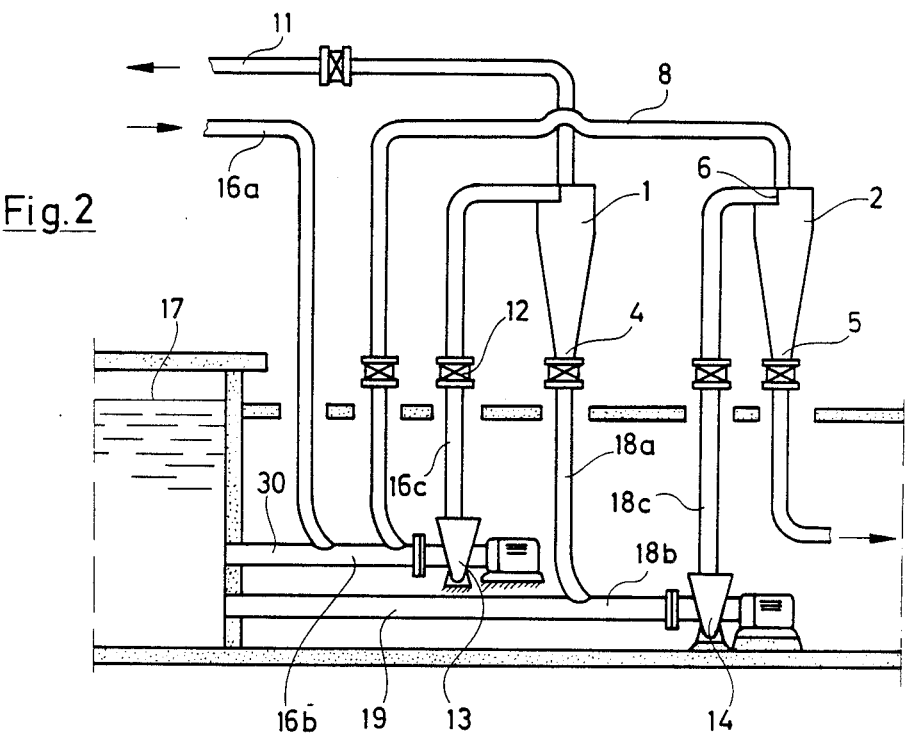
FIG. 2 shows a conventional plant comprising two hydrocyclones.

In FIG. 2, there is shown, in more detail, a conventional hydrocyclone plant with two hydrocyclones in a cascade connection. Parts in FIG. 2 having counterparts in FIG. 1 have been given the same reference numerals and need not be further described. A heavy phase conduit 18a-c connects the heavy phase outlet 4 of the first hydrocyclone 1 with the inlet 6 of the second hydrocyclone 2. From the container 17 a conduit 19 is extending to the heavy phase conduit. A pump 14 is arranged between the connection point for the conduit 19 and the inlet 6 of the second hydrocyclone 2.

In FIG. 3 there is shown a hydrocyclone plant according to the invention comprising two hydrocyclones connected in cascade. Parts having counterparts in the conventional hydrocyclone plant according to FIG. 2, which is also comprising two hydrocyclones, have been given the same reference numerals. In series between the two hydrocyclones 1 and 2 there is connected a device for degassing and mixing of streams of heavy phase and diluting liquid. This device comprises a rotationally symmetrical chamber 20 with an upper cylindrical portion 21 and a lower cylindrical portion 22, which latter is coaxial with the upper portion. The lower chamber portion 22 has a larger volume and radius than the upper chamber portion 21 (FIG. 3 and 4). The latter has a tangential inlet 23 connected to the conduit 18a and a central outlet 24 for separated gas. The lower chamber portion 22 has a radial inlet 25 connected to the conduit 19 and an outlet 26 connected to the conduit 18b. A deflecting plate 27 extends axially upwards from the bottom in the lower chamber portion 22, separating the radial inlet 25 from the outlet 26.

The inlet 23 to the upper chamber portion 21 is preferably provided with a means 28 for adjusting the working pressure in the first hydrocyclone 1, leading to a maximum rate of flow into the chamber (FIG. 5). In such case, the valve in the conduit 18a is eliminated.

The hydrocyclone plant according to the invention (FIGS. 3 to 5) operates in the following manner:

The fiber suspension to be separated into a light phase free from heavy impurities, and a heavy phase containing impurities, is supplied to the hydrocyclone plant through the conduit 16a. The suspension, which has a fiber content of for instance 2-3%, is first diluted by diluting liquid from the container 17 before it is supplied to the first hydrocyclone 1 by the pump 13. In this hydrocyclone, the suspension is separated into a light phase, which is conducted through the conduit 11 to for instance a paper making machine, and a heavy phase, which is conducted through the outlet 4 and further through the conduit 18a.

In addition to impurities, the heavy phase from the first hydrocyclone 1 contains a certain amount of fibers, about 2%, and a certain amount of air. The heavy phase is to be supplied to the second hydrocyclone 2, but before that it should be degassed and diluted.

The heavy phase flowing in the conduit 18a is supplied to the upper chamber portion 21 through the tangential inlet 23, such that the heavy phase stream is brought into rotation in the chamber 20, forming a core 29 of separated gas in the center of said chamber. The separated gas leaves the chamber 20 through the central outlet 24 at the upper end of the upper chamber portion 21. Diluting liquid from the container 17 is supplied to the lower chamber portion 22 through the conduit 19 and the radial inlet 25. The axial deflecting plate 27 in the lower chamber portion 22 gives the incoming stream of diluting liquid an axial flow direction, such that it is brought into contact with the central gas core 29, which is extending a distance down into the lower chamber portion 22. The gas contained by the diluting liquid then is transferred to the gas core 29.

The lower chamber portion 22 is formed with a larger volume and a larger radius than the upper chamber portion 21, the reason for which is that the stream of diluting liquid is larger than the stream of heavy phase, for instance three times larger, and that the rate of flow of the diluting liquid should not exceed about 0.5 metre/second, so that the diluting liquid is given enough time to be degassed when it passes the central gas core 29.

The upper chamber portion 21 communicates with the lower chamber portion 22 such that the rotating degassed stream of heavy phase, which flows from the upper chamber portion 21 into the lower chamber portion 22, continues to rotate in the lower chamber portion 22. The central gas core 29, hereby, will extend a distance down into the lower chamber portion 22. In addition, the rapidly rotating stream of heavy phase will meet the slowly flowing stream of diluting liquid, such that a good mixing of said streams is obtained.

The degassed mixture of heavy phase and diluting liquid flows through the outlet 26 to the conduit 18b. The mixture is pumped by the pump 14 under a higher pressure further through the conduit 18c to the inlet 6 of the second hydrocyclone 2. In the latter, the mixture is separated into a final heavy phase, which leaves through the outlet 5, and a light phase, which is returned to the first hydrocyclone 1 via the conduits 8 and 16b, the pump 13, and the conduit 16c.

By the invention a hydrocyclone plant is obtained, by means of which the air content of the discharged light phase can be reduced to such an extent that further degassing often will not be necessary. Practical tests have proved an air reduction of up to 50-60%.

We claim:

1. In combination with a hydrocyclone plant for separating a pulp suspension into a light phase and a heavy phase and including at least two hydrocyclones each having an inlet for a stream to be separated, an outlet for a stream of light phase and an outlet for a stream of heavy phase, a heavy phase conduit connecting the heavy phase outlet of one of the hydrocyclones with the inlet of the other hydrocyclone, a container with a diluting liquid, a conduit for conducting a stream of diluting liquid from said container to a point in said heavy phase conduit, and a pump in the heavy phase conduit between said point thereof and the inlet to said other hydrocyclone, the improvement comprising a device for degassing said streams of heavy phase and diluting liquid and for mixing said streams, said device having rotationally symmetrical chamber forming part of said heavy phase conduit, said device comprising means for maintaining a central core of separated gas within a rotating stream of heavy phase in said chamber, said means including a tangential inlet of said chamber and a part of said heavy phase conduit leading from said heavy phase outlet of said one hydrocyclone to said tangential inlet, the chamber also having a central outlet coinciding with said core for discharging separated gas, the chamber also having a diluting liquid inlet separate from and spaced axially from the tangential inlet and connected to the diluting liquid conduit for the supply of a stream of diluting liquid, said diluting liquid inlet being located to cause the liquid entering said liquid inlet to contact said central gas core and thereby degas the diluting liquid stream, said chamber also having an outlet for a degassed mixture of heavy phase and diluting liquid connected to the heavy phase conduit in advance of said pump.

2. The combination of claim 1, in which the diluting liquid inlet of the chamber is directed radially thereof.

3. The combination of claim 1 or 2, in which said chamber contains a deflecting plate operable to give the incoming steam of diluting liquid an axial flow direction into contact with said central gas core.

4. The combination of claim 1 or 2, comprising also means associated with the heavy phase inlet of the chamber for adjusting the working pressure in said one hydrocyclone to provide a maximum rate of flow of the heavy phase into the chamber.

5. The combination of claim 1 or 2, in which said chamber has a first portion provided with the tangential inlet and the central outlet for separated gas, the chamber also having a second portion provided with the diluting liquid inlet and the outlet for a degassed mixture, the first chamber portion communicating with the second chamber portion so that the rotating degassed stream flowing form the first chamber portion into the second chamber portion continues to rotate in the second chamber portion.

6. The combination of claim 5, in which the first and second chamber portions are arranged coaxially.

7. The combination of claim 5, in which the second chamber portion has a larger volume than the first chamber portion.

8. The combination of claim 5, in which the first and second chamber portions are cylindrical.

9. The combination of claim 8, in which the first chamber portion has a smaller radius than the second chamber portion.

10. In the operation of a hydrocyclone plant for separating a pulp suspension into a light phase and a heavy phase and including first and second hydrocyclones each having an inlet for a stream to be separated, an outlet for a stream of light phase and an outlet for a stream of heavy phase, the method which comprises feeding said stream form the heavy phase output of said first hydrocyclone through a tangential inlet to a rotationally symmetrical chamber, rotating said heavy phase stream from the tangential inlet about a central axis of said chamber while maintaining on said axis a core of separated gas within the rotating stream, discharging separated gas from said core through an axial outlet of the chamber during said rotating and while feeding a stream of diluting liquid into a region of the chamber spaced from the tangential inlet, contacting said liquid stream with said gas core to degas the diluting liquid, discharging a mixture of heavy phase and degassed diluting liquid from the chamber through an outlet spaced from the tangential inlet, and pumping said mixture from said spaced outlet to said inlet of the second hydrocyclone.

11. The method of claim 10, comprising also deflecting the diluting liquid stream from said region to a location in the chamber where the diluting liquid contacts said gas core before joining the heavy phase discharged through said spaced outlet.

12. The method of claim 10, in which said heavy phase stream is fed into one end portion of the chamber from which said separated gas is discharged, said diluting liquid being fed into the chamber at its opposite end portion from which said mixture is discharged.

* * * * *